United States Patent [19]

Enomoto et al.

[11] Patent Number: 5,979,742

[45] Date of Patent: Nov. 9, 1999

[54] FRICTION AGITATION JOINING METHOD FOR JOINING METALLIC JOINING MEMBERS

[75] Inventors: Masatoshi Enomoto; Seiji Tasaki; Naoki Nishikawa; Ichiro Iwai; Takenori Hashimoto, all of Oyamashi, Japan

[73] Assignee: Showa Aluminum Corporation, Japan

[21] Appl. No.: 09/047,009

[22] Filed: Mar. 24, 1998

[30] Foreign Application Priority Data

Mar. 25, 1997 [JP] Japan ................................... 9-071945

[51] Int. Cl.⁶ .................................................. B23K 20/12
[52] U.S. Cl. ................... 228/112.1; 228/135; 228/173.6; 228/265
[58] Field of Search ................................. 228/112.1, 114, 228/171, 173.6, 265, 2.1; 156/73.5, 580

[56] References Cited

U.S. PATENT DOCUMENTS

| | | | |
|---|---|---|---|
| 3,860,468 | 1/1975 | Scherer | 156/73.5 |
| 5,088,638 | 2/1992 | Karaev et al. | 228/112.1 |
| 5,460,317 | 10/1995 | Thomas et al. | 228/112.1 |
| 5,492,581 | 2/1996 | Searle | 156/73.5 |
| 5,697,511 | 12/1997 | Bampton | 220/4.12 |
| 5,697,544 | 12/1997 | Wykes | 228/2.1 |

FOREIGN PATENT DOCUMENTS

WO 95/26254  10/1995  WIPO .

*Primary Examiner*—Samuel M. Heinrich

[57] ABSTRACT

In a friction agitation joining method for joining metallic joining members, a joining device having a column-shaped rotor of a larger diameter and a pin-shaped probe of a smaller diameter integrally formed on an end of the rotor and protruded along an axis of the rotor is used for joining the metallic joining members. The probe is rotated and inserted into or around a butted portion of the joining members to soften a contact portion contacted by the probe by friction heat and to agitate the contact portion so that the joining members are butt joined. Each joining member has a thick portion at a butting side thereof The rotating rotor is contacted to the thick portions under pressure to soften the thick portions by friction heat so that a gap formed at the butted portion is filled with the materials of the softened thick portions.

16 Claims, 3 Drawing Sheets

1

FRICTION AGITATION JOINING METHOD FOR JOINING METALLIC JOINING MEMBERS

BACKGROUND OF THE INVENTION

1. Field of the Invention

The present invention relates to a friction agitation joining method for joining metallic joining members, and relates more particularly to a friction agitation joining method for butt joining metallic members to be joined, such as aluminum members or its alloys.

2. Description of the Related Art

Conventionally, as a friction agitation joining method, which is one type of solid-phase joining method, the following method has been proposed. In the method, a joining device 103 as shown in FIG. 3 has been used. The joining device 103 is provided with a column-shaped rotor 130 having a larger diameter and a pin-shaped probe 132 having a smaller diameter. The probe 132 is integrally provided on an end of the rotor 130 so as to protrude along an axis of the rotor 130 and is made of materials harder than that of the members 101, 102 to be joined (hereinafter referred to as "joining members"). While rotating the rotor 130, the probe 132 is inserted into a butted portion of the two members 101, 102. Generally, such insertion of the probe 132 will be performed until an end face 131 of the rotor 130 on which the probe 132 is formed, touches the joining members 101, 102. And then, while the probe 132 is inserted in the abutted portion, the probe 132 is advanced against the joining members 101, 102 along the abutted portion. At a portion of the joining members 101, 102 where the probe 132 contacts and around thereof, the materials of the joining members 101, 102 will be softened by the friction heat generated due to the rotation of the probe 132 and agitated by the probe 132. In accordance with the advancing movement of the probe 132, the softened and agitated materials of the joining members 101, 102 are plastically fluidized to go around the probe 132 and to full up a grove formed behind the probe 132 as it moves by the pressure caused by the advancing movement of the. probe 132. Then, the materials will be cooled and solidified by the immediate loss of such friction heat. This phenomenon will be repeated with the advancing movement of the probe 132, which causes the joining members 101, 102 to be joined.

This friction agitation joining method has advantages in that the materials of metallic joining members are not limited and the deformation of the joining members caused by heat stress is small.

When long joining members are to be joined with their longitudinal edges butted, the butted portion may have gaps in places due to stress of the joining members. In the friction agitation joining method, because filler metals will not be supplied from outside as in melt welding, such as with TIG welding, the materials to be supplied for joining may be insufficient at portions where gaps exist. In this case, the gaps will not be filled up, which cause joining defects, resulting in poor joining.

SUMMARY OF THE INVENTION

The object of the present invention is to provide a friction agitation joining method for joining metallic joining members which can join the joining members at a high joining likelihood without causing joining defects even if there are gaps at a butting portion of the joining members.

In order to achieve the above mentioned object, according to the present invention, in a friction agitation joining method for joining metallic joining members wherein a joining device having a column-shaped rotor of a larger diameter and a pin-shaped probe of a smaller diameter integrally formed on an end of the rotor and protruded along an axis of the rotor is used for joining the metallic joining members, and wherein the probe is rotated and inserted into a butted portion, or there-around, of the joining members to soften a contact portion contacted by the probe by friction heat and to agitate the contact portion so that the joining members are butt joined, the improvement which comprises:

preparing the joining members to each have a thick portion at a butting side thereof;

touching the rotating rotor to the thick portions under pressure to soften the thick portions by friction heat so that a gap formed at the butted portion is filled with materials of the softened thick portions.

In the above method, since the materials of the thick portions are softened by the heat generated by the strong friction of the rotor and go around the probe, the softened materials are agitated together with the materials softened by the heat generated by the friction of the probe to supply material for joining. Therefore, even if there are gaps in the butted portion, the material for joining will not be insufficient, which enables the joining members to join in a state in which the gaps are almost completely filled with the materials.

Other objects and features will be apparent from the following detailed description of the invention with reference to the attached drawings.

BRIEF DESCRIPTION OF THE DRAWINGS

The preferred embodiments of the present invention will be more fully detailed and the present invention will be better understood from the following description, taken with the appended drawings, in which;

FIGS. 1A to 1C show a first embodiment according to the present invention, wherein FIG. 1A shows a joining device that is about to be inserted into the joining members, FIG. 1B shows the rotor inserted into thick portions of the joining members, and FIG. 1C shows a cross-section of the joined members;

FIGS. 2A and 2B are cross-sectional views of an another embodiment of the thick portions of the joining members, wherein FIG. 2A shows a joining device that is about to be inserted into the joining members, FIG. 2B shows the rotor inserted into the thick portions;

DETAILED DESCRIPTION OF THE PREFERRED EMBODIMENTS

Preferred embodiments of the friction agitation joining method for joining metallic joining members according to the present invention will now be described, in detail, with reference to the accompanying drawings.

Figure 1A:
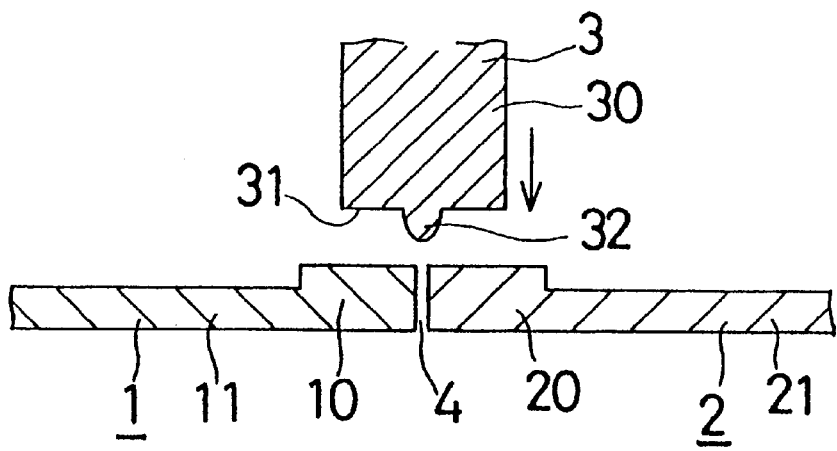
Figure 1B:
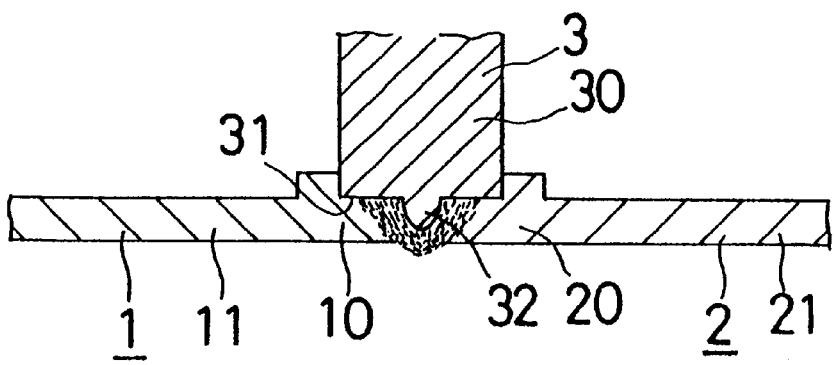
Figure 1C:
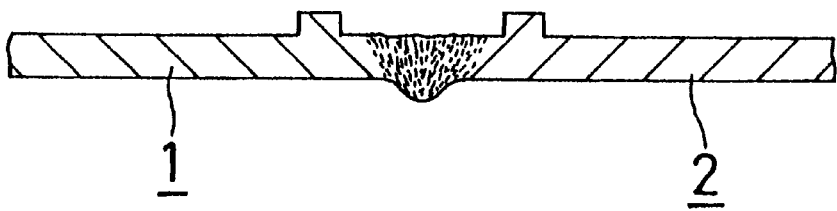

FIGS. 1A to 1C show a first embodiment of the present invention. FIG. 1A shows a cross-section of a joined portion having a gap when joining members 1, 2 are butted. In FIG. 1A, the reference numeral 3 denotes a joining device for use in a friction agitation joining method for joining metallic joining members.

The joining members 1, 2 are plate-shaped aluminum extrusions which are butted in the direction of their width and which are to be joined along their whole length. The joining members 1, 2 have upwardly protruded thick portions 10, 20 having a rectangular cross-sectional shape at their butting side thereof.

The joining device 3 is provided with a column-shaped rotor 30 having a larger diameter and a pin-shaped probe 32 having a smaller diameter. The probe 32 is integrally provided on an end of the rotor 30 so as to protrude along an axis of the rotor 30 and is rotated as the rotor 30 rotates. The probe 32 is made of materials which are harder than the joining members 1, 2 and can stand friction heat generated during joining. The surface of the rotor 30 is formed to be uneven, e.g. screw-shape, to enable an easy frictional agitation of materials of the joining members 1, 2.

In the first embodiment, the joining members 1, 2 are joined as follows. As shown in FIG. 1A, the joining members 1, 2 are fixed to each other with their thick portions 10, 20 butted. In this butted state, the butted portion inevitably has gaps 4 in some places. Then, as shown in FIG. 1B, while rotating the rotor 30 of the joining device 3, the probe 32 is inserted into a butted portion of the thick portions 10, 20. When the end portion 31 of the rotor 30 touches the surface of the thick portions 10, 20, the rotor 30 is further pushed down to insert the rotor 30 together with the probe 32 into the thick portions 10, 20. Materials of the thick portions 10, 20 where the probe 32 contacts and a region there-around will be softened by the friction heat generated by the friction between the probe 32 and the thick portions 10, 20 and by the friction between the end portion of the rotor 30 and the thick portions 10, 20, and the softened materials will go around the probe 32 to be agitated.

Next, in the above-mentioned state, the rotor 30 and the probe 32 are moved in the longitudinal direction of the joining members 1, 2 along the butted portion. It is preferable that the rotor 30 and the probe 32 advance with the rotor and the probe slightly leaned backward from an advancing moving direction thereof. The reason is as follows. When this is done, a front edge of the rotor 30 located at the front side, toward the advancing moving direction thereof, slightly rises from the surface of the joining members 1, 2, the front edge is prevented from being caught on the surface of the joining members 1, 2, resulting in a smooth advancing movement of the rotor 30.

In accordance with the advancing movement of the probe 32, the softened and agitated materials of the joining members 1, 2 are plastically fluidized to go around the probe 32 to fill up a grove formed behind the advancing movement of the probe 32 by the pressure caused by the advancing probe 32. Then, the materials will be cooled and solidified by the immediate loss of the friction heat. This phenomenon will be repeated with the advancing movement of the probe 32, which enables a friction agitation joining of the butted portion of the joining members 1, 2 along the whole length thereof.

According to the above-mentioned joining method, even if there are gaps in the butted portion, since the materials of the thick portions are softened by the rotor 30 and supplied to the gaps, the softened materials for joining will not be insufficient, which enables the gaps to be filled with materials. Thus, the joining members can be joined with a high joining accuracy without causing joining defects.

A modified embodiment of the thick portions 10, 20 will now be explained as follows.

Figure 2A:
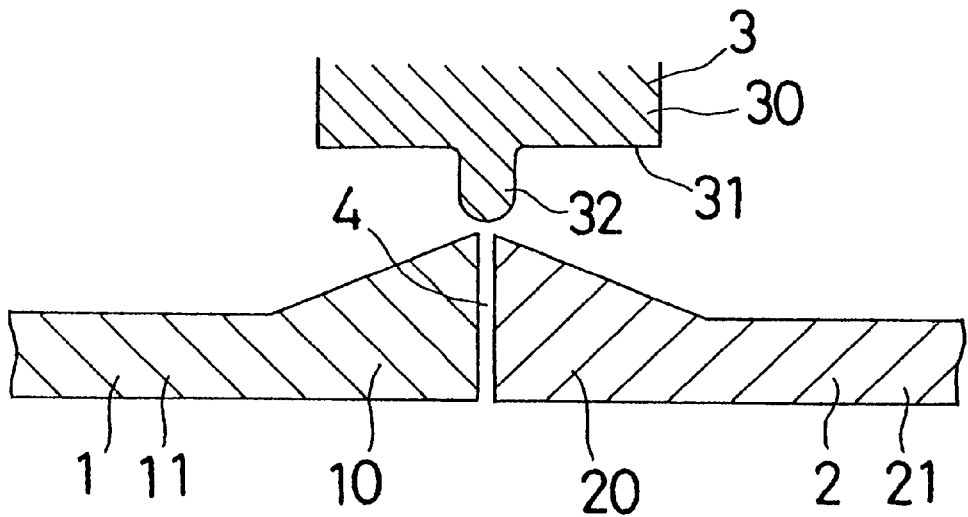

As shown in FIG. 2A, the thick portions 10, 20 are formed to have a triangular cross-section having a thickness increased toward the butting sides, respectively. The thick portions 10, 20, each having a triangular cross-section as mentioned above, have following advantages.

Figure 2B:
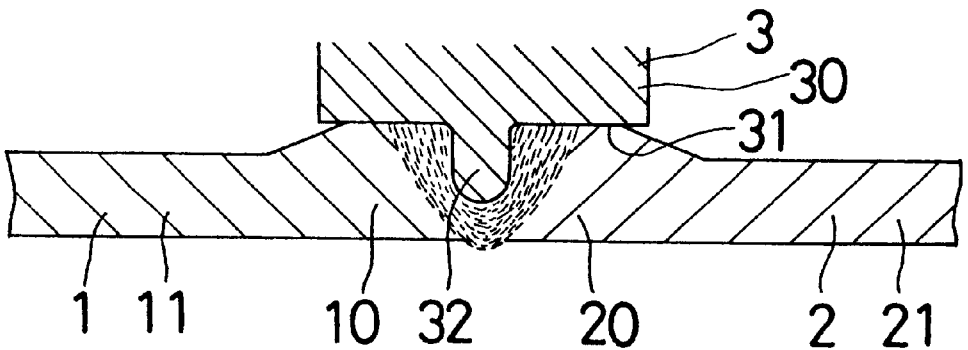

As shown in FIG. 2B, when the rotor 30 is pushed down to the thick portions 10, 20 during the joining process, the acute peak portions of the thick portions 10, 20 are flattened, which can decrease the unevenness of the surface of the joined portions as compared to the rectangular-shaped thick portions shown in FIG. 1C, resulting in a high quality surface of the joined portion.

Figure 2C:
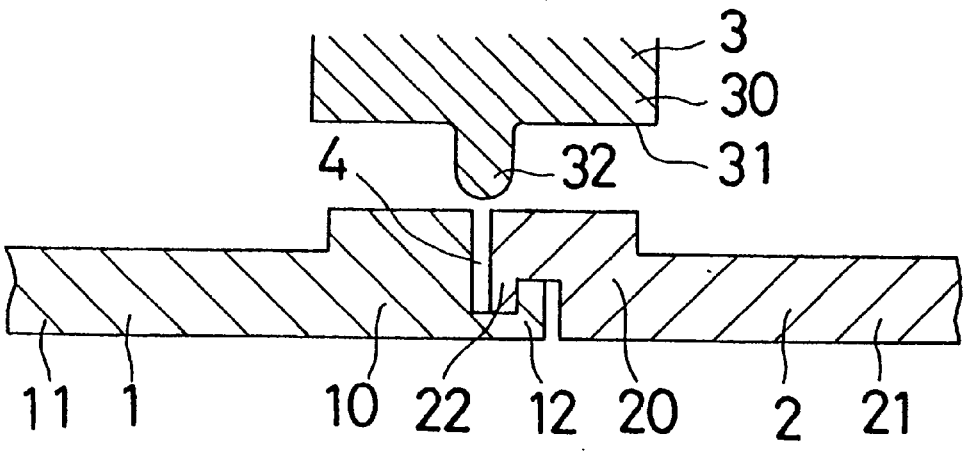
FIG. 2C is a cross-sectional view of a still another embodiment of the thick portions of the joining members.
Figure 3:
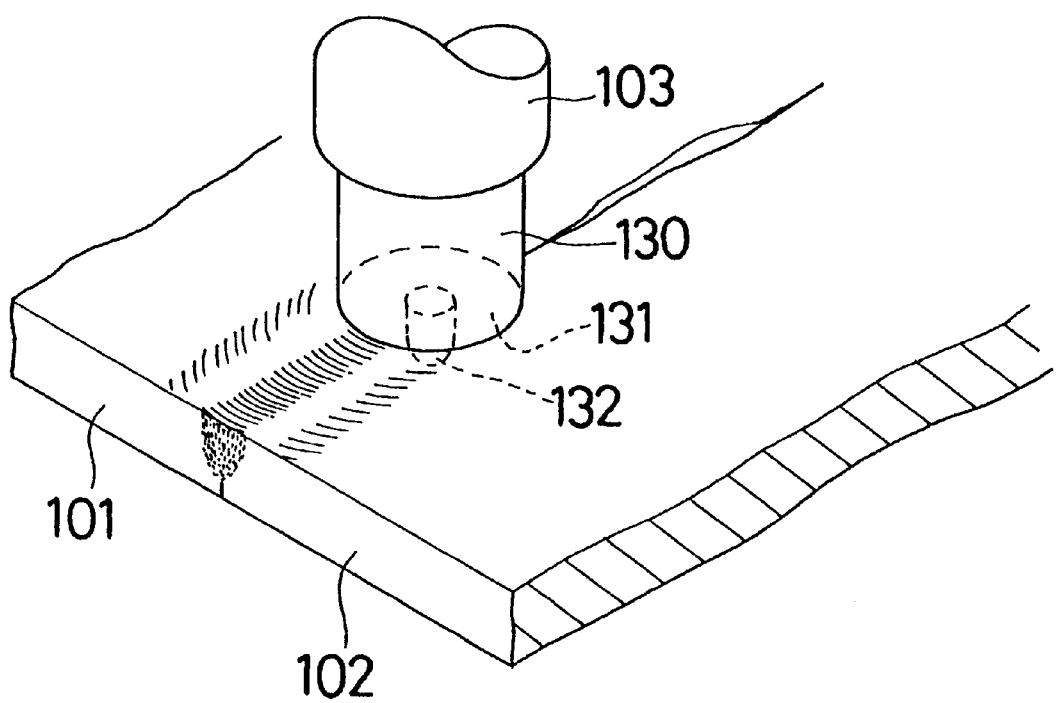
FIG. 3 is a perspective view showing related art.

FIG. 2C shows still another embodiment of the joining members 1, 2. The joining members 1, 2 have thick portions 10, 20 each having butting faces. At lower portions of the butting faces, i.e., at portions opposite to the portions at which the probe 32 is inserted, protrusions 12, 22, which are protruded so as to be engaged with each other, are provided. One of the protrusions has an L-shaped cross-section and the other has a reversed L-shaped cross-section. The width of the thick portions 10, 20 in a butted and engaged state is preferably set to be smaller than a diameter of the rotor 30. However, the width may be set to be larger than the diameter of the rotor 30. When the thick portions 10, 20 are formed to be engageable with each other as shown in FIG. 2C, the engagement of the protrusions 12, 22 prevents the joining members 1, 2 from being detached, which results in a higher joining efficiency.

The shapes of the thick portions 10, 20 are not limited that described above, and any kind of shape may be employed. For example, the thick portions 10, 20, each having a triangular-shape as shown in FIG. 2A, may have protrusions 12, 22, each having an L-shaped cross-section as shown in FIG. 2C, so as to be engaged each other.

In addition, the joining members applied to the present invention are not limited to that described above. For example, as for their shape, the joining members are not limited to plate-shaped members. The joining members applied to the present invention may be any kind of shape. As for the materials, the joining members are not limited to aluminum, but may be steel, copper, brass, etc. The joining members may also be manufactured by rolling, casting, die casting, or the like.

As for the advancing movement of the joining device, the present invention is not limited to the above-mentioned embodiment in which the rotor is advanced while the rotor is inserted in the thick portions. For example, the joining device can be advanced after detaching the inserted rotor from the thick portions and then the rotor can be inserted again, and this may be repeated.

Examples according to the present invention will now be described.

Example No.1

Cross-sectional shape:

Thick portion: 4 mm thickness×15 mm width

Body portion: 3 mm thickness×130 mm width

Length: 1000 mm

Material: JIS 6N01 aluminum alloy (T5 homogenized)

Manufacturing method: Extrusion

Example No.2

Cross-sectional shape:

Thick portion: 4 mm thickness×20 mm width (having L-shaped engageable protrusions shown in FIG. 2C)

Body portion: 3 mm thickness×125 mm width

The other conditions are the same as in Example No. 1

Comparison Example No.3

Cross-sectional shape:

Thick portion: 3 mm thickness×200 mm width

The other conditions are the same as in Example No. 1

In example No. 1, the joining members were fixed with the edges of the thick portions butted. In example No. 2, as shown in FIG. 2C, the joining members were fixed with the edges of the thick portions engaged. In the comparison example No. 3, the joining members were fixed with the edges of the thick portions simply butted. Then, the butted portion in each example was joined along the whole length thereof under the following condition. In all of the examples, a gap of about 0.5 mm width was formed at the butted portion when the joining members were butted.

Condition of friction agitation joining in the examples:

Rotation speed: 1500 rpm

Probe: 4 mm diameter×4 mm length

Rotor: 20 mm diameter

In example Nos. 1 and 2, at the initial step when the probe is inserted, the rotor was further inserted by 1 mm from the state at which the edge portion of the rotor touched the surface of the thick portions. And, in this state, the probe and the rotor were advanced along the butted portion of the joining members while softening the materials of the thick portions to join the joining members. On the other hand, in the comparison example No. 3, the rotor was not further inserted from the state at which the edge portion of the rotor touched the surface of the joining members. And, in this state, the probe and the rotor were advanced along the butted portion of the joining members to join the joining members.

Each joint portion was observed. Each below mentioned joint rate denotes a rate of a tensile strength of each joined portion to a strength of each base metal.

TABLE 1

| Material | Shape of thick portions | Joint rate |
| --- | --- | --- |
| Example No. 1 | Rectangular-shape | 95% |
| Example No. 2 | Engageable L-shape | 97% |
| Comparison No. 3 | No thick portion | 70% |

As understood from Table 1, the joint rates in example Nos. 1 and 2 according to the present invention are higher than that in the comparison example No. 3.

The present invention relates to a frictional agitation joining method for butt joining in which materials of thick portions are softened by friction heat caused by the rotor and is utilized for filling gaps. Therefore, even if there are gaps in the butted portion, the material for joining will not be insufficient, which enables the joining members to join in a state in which the gaps are almost completely filled with the materials.

Although preferred embodiments according to the present invention has been described, it should be recognized that various modifications are possible within the scope of the present invention. In addition, this application claims priority to Japanese Patent Application No. Hei 9(1997)-71945, the disclosure of which is incorporated by reference in its entity.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. In a friction agitation joining method for joining metallic joining members wherein a joining device having a column-shaped rotor of a larger diameter and a pin-shaped probe of a smaller diameter integrally formed on an end of said rotor and protruded along an axis of said rotor is used for joining said metallic joining members, and wherein said probe is rotated and inserted into or around a butted portion of said joining members to soften a contact portion contacted by said probe by friction heat and to agitate said contact portion so that said joining members are butt joined, the improvement which comprises:

preparing said joining members to each have a thick portion at a butting side thereof;

touching said rotating rotor to said thick portions under pressure to soften said thick portions by friction heat so that a gap formed at said butted portion is filled up with materials of said softened thick portions.

2. The friction agitation joining method for joining metallic joining members as recited in claim 1, wherein each said thick portion is formed to have a rectangular cross-section.

3. The friction agitation joining method for joining metallic joining members as recited in claim 1, wherein each said thick portion is formed to have a triangular cross-section having a thickness increased toward said butting side.

4. The friction agitation joining method for joining metallic joining members as recited in claim 1, wherein each said thick portions have protrusions engageable with each other, each protrusion having an L-shaped cross-section and protruding in a butting direction.

5. The friction agitation joining method for joining metallic joining members as recited in claim 2, wherein each said thick portions have protrusions engageable with each other, each protrusion having an L-shaped cross-section and protruding in a butting direction.

6. The friction agitation joining method for joining metallic joining members as recited in, claim 3, wherein each said thick portions have protrusions engageable with each other, each protrusion having an L-shaped cross-section and protruding in a butting direction.

7. The friction agitation joining method for joining metallic joining members as recited in claim 1, wherein joining said joining members is performed while said rotor and said probe is advanced against said joining members along said butted portion.

8. The friction agitation joining method for joining metallic joining members as recited in claim 1, wherein said probe is inserted until said end of said rotor contacts said thick portions.

9. The friction agitation joining method for joining metallic joining members as recited in claim 1, wherein said rotor and said probe advance with said rotor and said probe leaning slightly rearward from an advancing direction of said rotor and said probe.

10. The friction agitation joining method for joining metallic joining members as recited in claim 1, wherein said joining members are made of an extruded aluminum or its alloys.

11. In a friction agitation joining method for joining metallic joining members wherein a joining device having a column-shaped rotor of a larger diameter and a pin-shaped probe of a smaller diameter integrally formed on an end of said rotor and protruded along an axis of said rotor is used for joining said metallic joining members, and wherein said probe is rotated and inserted into or around a butted portion of said joining members to soften a contact portion contacted to said probe by friction heat and to agitate said contact portion, and wherein said rotor and said probe are advanced against said joining members along said butted portion so that said joining members are butt joined, the improvement which comprises:

preparing said joining members to each have a thick portion at a butting side thereof;

inserting said probe until said end of said rotor contacts said thick portions; and touching said rotating rotor to said thick portions under pressure to soften said thick portions by friction heat so that a gap formed at said butted portion is filled with materials of said softened thick portions.

12. The friction agitation joining method for joining metallic joining members as recited in claim 11, wherein each said thick portion is formed to have a rectangular cross-section.

13. The friction agitation joining method for joining metallic joining members as recited in claim 11, wherein each said thick portion is formed to have a triangular cross-section having a thickness increased toward said butting side.

14. The friction agitation joining method for joining metallic joining members as recited in claim 11, wherein said thick portions have protrusions engageable with each other, each protrusion having an L-shaped cross-section and protruding in a butting direction.

15. The friction agitation joining method for joining metallic joining members as recited in claim 12, wherein said thick portions have protrusions engageable with each other, each protrusion having an L-shaped cross-section and protruding in a butting direction.

16. The friction agitation joining method for joining metallic joining members as recited in claim 13, wherein said thick portions have protrusions engageable with each other, each protrusion having an L-shaped cross-section and protruding in a butting direction.

* * * * *